UNITED STATES PATENT OFFICE.

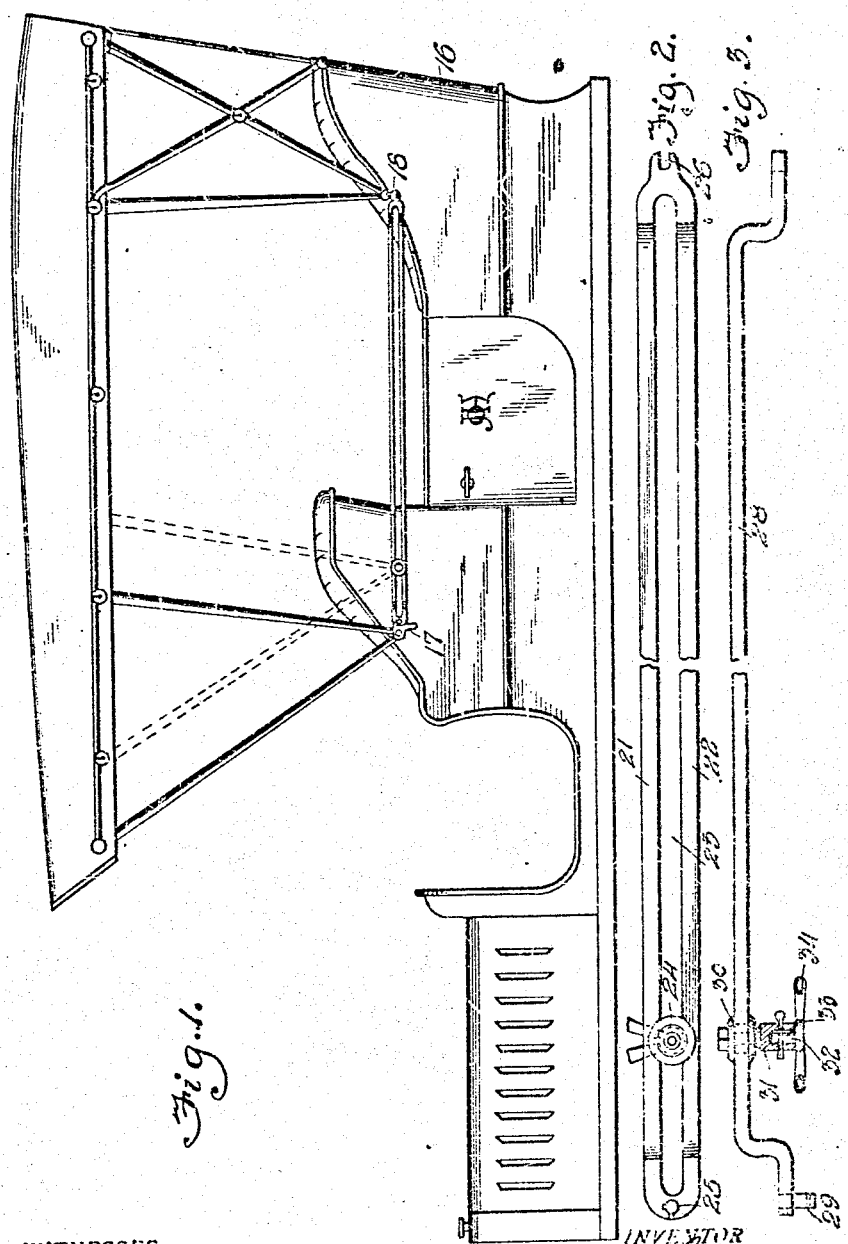

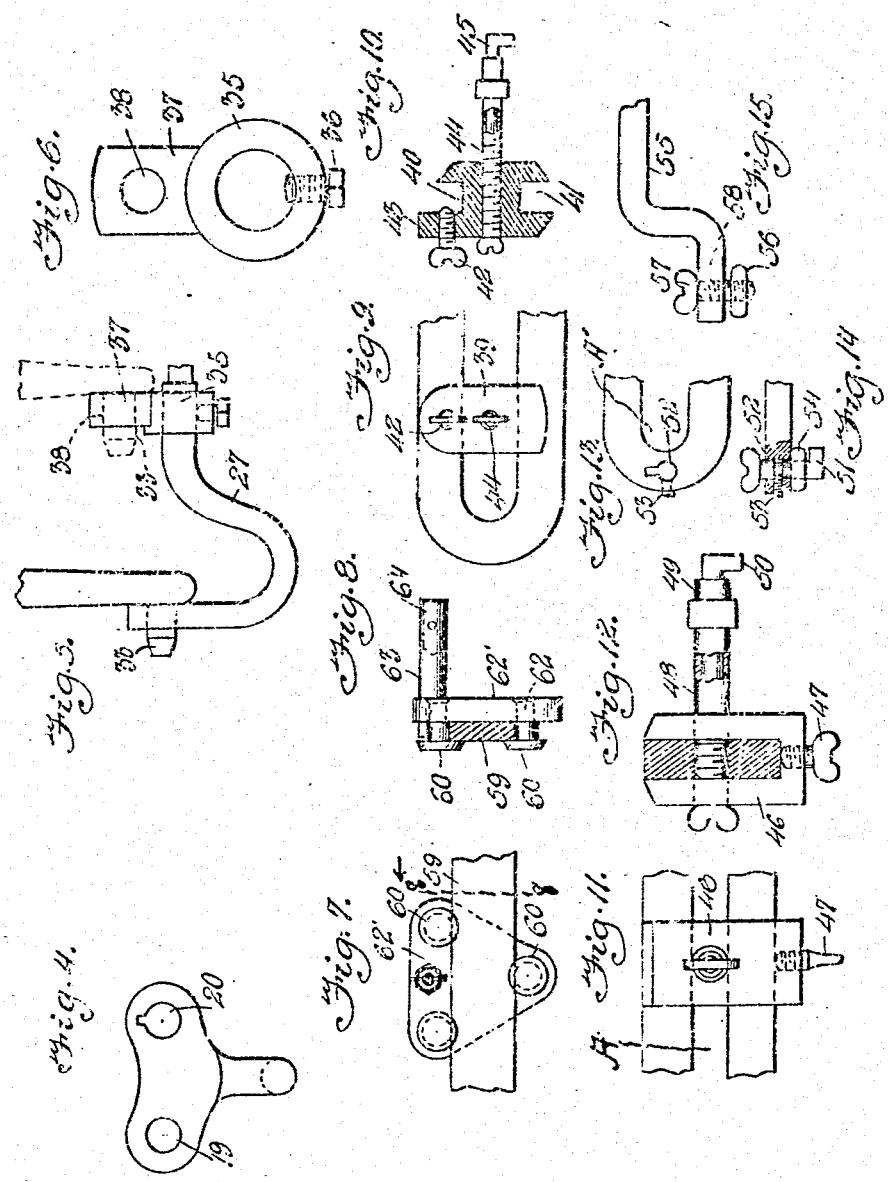

GEORGE H. SMITH, OF JANESVILLE, WISCONSIN, ASSIGNOR OF ONE-FOURTH TO EDWARD J. SMITH, OF CHICAGO, ILLINOIS, AND ONE-FOURTH TO JOSEPH M. CONNORS, OF JANESVILLE, WISCONSIN.

VEHICLE-TOP.

1,009,999.  Specification of Letters Patent.  Patented Nov. 28, 1911.

Application filed June 17, 1910. Serial No. 567,454.

*To all whom it may concern:*

Be it known that I, GEORGE H. SMITH, a citizen of the United States of America, and resident of Janesville, in the county of Rock and State of Wisconsin, have invented certain new and useful Improvements in Vehicle-Tops, of which the following is a specification.

This invention relates to attachments for vehicles, the said attachments being designed primarily for the purpose of facilitating the movement of tops such as the extension tops now usually employed on automobiles.

An object of this invention is to produce an attachment for automobiles or the like which will be effective in supporting and guiding the top while it is being moved for the purpose of folding it or for the purpose of extending or placing it in position to cover both the front and the rear seats.

A further object of this invention is to produce detachably connected guide bars associated with novel means for connecting the said guide bars to vehicles in which there is a difference in the distances between the top-irons at or near the front and rear seats, novel means being also provided for detachably connecting the said rails or guiding members in order that one person may manipulate the top for the purpose of changing its position in the manner indicated above.

A further object of this invention is to provide a support for the vehicle top which is capable of application to cars now in general use and provision is also made for a special construction of the top-iron which will more conveniently permit the manipulation of the top for effecting the result indicated.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 illustrates a view in elevation of a body of an automobile having a top with the attachment applied thereto. Fig. 2 illustrates an enlarged detail view of one of the guiding and supporting members with a traveling member associated therewith; Fig. 3 illustrates a top plan view of a guiding member with parts associated therewith, the same embodying a slightly modified arrangement for connecting the attachment to the top-iron; Fig. 4 illustrates a view in elevation of a top-iron designed to take the place of the ordinary goose neck type irons now commonly used; Fig. 5 illustrates a side elevation of the top-iron now commonly used with a clamp applied thereto for temporarily holding the top; Fig. 6 illustrates an enlarged detail view of the clamp; Fig. 7 illustrates a front view in detail of a guiding member applied to a single guide bar; Fig. 8 illustrates a sectional view on the line 8—8 of Fig. 7; Fig. 9 illustrates a modified construction in part comprising a clamp designed to be used in connection with a double guide bar; Fig. 10 illustrates a vertical sectional view through the clamp adapted for use in connection with a double guide bar; Fig. 11 illustrates a view in elevation of the front of an adjustable clamp embodying a slightly modified construction likewise for use in connection with a single guide bar; Fig. 12 illustrates a sectional view on the line 12—12 of Fig. 11; Fig. 13 illustrates a detail view of a fragment of a guide bar having a key applied thereto; Fig. 14 illustrates the guide bar shown in Fig. 13 having a lock applied thereto in conjunction with a top-iron for supporting the guide bar; and Fig. 15 illustrates a further modification whereby a guide bar is secured to a top-iron.

In these drawings 16 denotes an automobile body provided with a front top-iron 17 and a rear top-iron 18 which may be of the goose neck type although in Fig. 1 the iron 17 is similar to the detail shown in Fig. 4, that is to say the said iron 17 has two apertures 19 and 20, the latter of which is of slightly irregular contour in order that a key (to be hereinafter described) may be used in connection with it and with a guide bar to be presently explained.

In the construction shown in Figs. 1 and 2, I provide a double guide bar having an upper and lower rail 21 and 22 with an intervening space 23 which is formed for the purpose of receiving the flanged wheel 24, the said flanged wheel being guided by the rails 21 and 22. The guide bar has a hole 25 in one end corresponding in contour to the opening 20 in the top-iron 17 and a key such for instance as is shown in Fig. 14 is applied to the apertures of the guide bar and top-iron for the purpose of retaining the members in operative relation. The end of the guide bar opposite the aperture 25 is provided with a socket 26 which receives the top iron on the rear seat so that after the guide bar has been applied to the top-iron on the rear seat and the key has been applied to the guide bar and to the top-iron on the front seat, the space between the two top-irons on one side of the vehicle body is bridged and therefore the top may be supported while the wheel 24 is moving on the guide-bar. For use in connection with vehicles now containing a top-iron 27 of the goose neck type shown in Fig. 5, having a single eye, I employ a guide-bar 28 which is in all respects similar to that shown in Fig. 2 except that the front end thereof is provided with a pin or stud 29 which is designed to be applied to the eye of the top-iron 27 whereas the rear end of the said guide-bar 28 is provided with a socket similar to that shown in Fig. 2 for the purpose of being fitted to the rear top-iron.

In both of the forms shown in Figs. 2 and 3, the flanged wheel is of the same construction although in dealing with the flanged wheel in Fig. 3 which embodies a slight modification, the said flanged wheel will be designated as 30 and referring to Fig. 3, it will be observed that the said flanged wheel 30 has a spindle or shank 31 with a socket 32 in its end provided for the purpose of receiving the socket pin 33 of the ribs 34 of the top. When the parts are in the position shown in Fig. 3, or in dotted lines Fig. 1, it follows that the flanged wheel may travel on the rail for the purpose of carrying the top rearwardly to the rear top-iron and that the reversal of the movement of the flanged wheel will result in carrying the top forward so that it may be manipulated without the operator sustaining the weight of the top while it is being moved.

When it is desired to apply the guide-bar to a front top-iron having a single eye, it is desirable that means be provided for supporting the top while the guide-bar is being fixed to the front top-iron and I therefore provide the said front top-iron with a collar 35 which may be held on the front top-iron by a set screw 36 having an aperture 38 for the reception of the socket pin 33. Fig. 5 shows the socket pin in dotted lines applied to the ear 37 and the said figure illustrates that the top is supported by the collar 35 in order that it may be possible to apply the guide bar to the top iron. After such an adjustment has been attained, the socket pin is placed in the socket of the spindle of the wheel as shown in Fig. 3.

From the foregoing, it will be observed that I can use this invention in connection with top-irons of the ordinary type or by having a top-iron such as is shown in Figs. 1 and 4, the guide-bar may be applied to the top-irons and the socket pin need not be disturbed until the parts are in position to permit a transfer of the socket pin from the socket, or the aperture 19 to the socket of the spindle of the flanged wheel.

I have found it desirable to provide means for connecting a guide-bar to vehicle bodies in which the distance between the top-irons is not always uniform and to that end I provide the guide bar with an adjustable connection with the top-irons, the same comprising a clamp which is slidable longitudinally of the guide-bar and provided with means for securing the said clamp in different positions of adjustment. I have provided two forms of clamps one of which is shown in Figs. 9 and 10 and I will therefore describe each in detail. One consists of a body 39 having an upper and lower slot 40 and 41 respectively adapted to receive the rails of the guide-bar. In the form shown in Figs. 9 and 10, I provide a set screw 42 which is threaded in the flange 43 of the clamp and I also provide the body of the clamp with an aperture in which a sleeve 44 is threaded, the said sleeve being provided with a key 45 which is rotatable in the sleeve and which is designed to project through the aperture 20 of the top-iron shown in Fig. 4, whereas the end of the sleeve rests in the said aperture for the purpose of supporting the guide bar.

In the form shown in Figs. 11 and 12, the clamp 46 is U-shaped and is adapted to embrace the rails, the said member having a set screw 47 threaded in its lower portion adapted to bind against one of the rails. In this form, the sleeve 48 extends through the sides of the clamp and also through the opening or slot A between the two rails so that the clamp is thereby slidable on the rails for the purpose of adjusting the position of the top-iron engaging end 49 of the sleeve with relation to a top-iron. In the form shown in Figs. 11 and 12 the key 50 is likewise provided which is rotatable in the sleeve for the purpose of locking the clamp with relation to the top-iron while the top is being manipulated.

In the form shown in Figs. 13 and 14, there is a guide-bar consisting of two rails only a fragment of which is shown, the front end of the rail being provided with a rotatable key 51 having an annular slot 52 forming a seat for the set screw 53 which is threaded in the end of the guide-bar and in this form, the top-iron 54 has an aperture of such contour as to receive the key when in a position at right angles to the position in which it is shown in Fig. 14 so that by inserting the key in the aperture of the top-iron and giving it a quarter turn, the guide-bar cannot be detached from the top-iron until the key is properly manipulated.

I show in Fig. 15 a further modified means for connecting the guide bar 55 to a top-iron 56 wherein the top-iron has a threaded aperture to receive the screw 57 which screw is also inserted in an aperture 58 of the guide bar. The details of construction for connecting the guide bar to the top iron may be variously modified, it being understood that in all of the forms described, the rear ends of the draw bar are provided with sockets to receive the rear top-irons.

I have further modified the construction of the guide bar as shown in Figs. 7 and 8 by employing one rail 59 and having a carriage thereon provided with anti-friction wheels 60 which anti-friction wheels are mounted on studs 62 projecting from the face of the plate 62', the said plate having a shank 63 provided with a socket 64 for the reception of the socket pins similar to the socket pin 33 of Fig. 5. By employing a carriage such as here illustrated which may be moved along the single rail, the top may be supported while the same is being moved from the front to the rear of a vehicle body and vice versa.

Fig. 13 also has an opening or slot A' for the accommodation of sliding blocks of the type shown in Figs. 10 and 11.

I claim:—

1. In a top support for vehicles, a guide bar, means for holding the guide bar in place to span the space between the top irons of a vehicle, a wheel guided on said bar and held against disengagement therewith, the said wheel having means for supporting a socket pin of a vehicle top, and said wheel being free to travel longitudinally of the guide bar.

2. In combination with the top irons of a vehicle body having sockets therein, of a socket pin fitting in the socket of said top iron, and a collar secured to the top iron having an apertured ear forming a socket to receive the socket iron of the top when said socket iron is removed from the socket of the top iron.

3. In combination with the top irons of a vehicle body, a guide-bar detachably connected thereto, the said guide-bar having two rails with an intervening space, a clamp comprising a body slidable in the space between the rails, means for binding the clamp in adjusted position on the guide bar, means for connecting the clamp to one of the top-irons, and a top engaging and supporting member mounted to move on the guide bar.

4. In combination with the top-irons of a vehicle body, a guide-bar detachably connected thereto, the said guide bar having two rails with an intervening space, a clamp comprising a U-shaped member, a top-iron engaging member extending through the space between the rails and through the sides of the U-shaped member for connecting the guide bar to the top-iron, and a top supporting and engaging member mounted to move on the guide-bar.

In testimony whereof, I affix my signature in the presence of two witnesses.

GEORGE H. SMITH.

Witnesses:
S. B. ECHLIN,
EDW. H. PETERSON.